United States Patent [19]

Temple

[11] 4,099,702
[45] Jul. 11, 1978

[54] DOUBLE HANDLE SELF-LOCKING MECHANISM FOR MANUAL OPERATION OF A COCK KEY

[75] Inventor: Fred Temple, Swissvale, Pa.

[73] Assignee: Westinghouse Air Brake Company, Wilmerding, Pa.

[21] Appl. No.: 735,498

[22] Filed: Oct. 26, 1976

[51] Int. Cl.² ............................................. F16k 35/00
[52] U.S. Cl. ................................ 251/95; 213/76;
       251/98; 251/288; 251/279; 251/289
[58] Field of Search ............... 213/76; 251/89.5, 95,
       251/98, 101, 107, 111, 114, 231, 232, 248, 286,
                                 287, 288, 289, 149, 279, 280

[56] References Cited

U.S. PATENT DOCUMENTS

| 755,918 | 3/1904 | Niederlander | 251/289 |
| 839,878 | 1/1907 | Niederlander | 251/289 |
| 867,718 | 10/1907 | Fravor | 251/289 |
| 913,287 | 2/1909 | Heiniger | 251/95 |
| 1,129,340 | 2/1915 | Down | 251/107 |
| 3,662,899 | 5/1972 | Randolph et al. | 251/289 |
| 3,812,980 | 5/1974 | Kolb et al. | 251/289 |

Primary Examiner—Martin P. Schwadron
Assistant Examiner—G. L. Walton
Attorney, Agent, or Firm—W. F. Poore; R. W. McIntire, Jr.

[57] ABSTRACT

This invention relates to a pivoted double handle self-locking mechanism for operating a valve. Each of a pair of oppositely extending handles is pivotally mounted on a socket member secured to a key that rotates the valve, each handle being provided with a gear segment that meshes with a corresponding gear segment on the other handle whereby rocking of either handle about its pivot by a lever connected thereto effects rocking of the other handle so that a lug on one handle is moved to a position in which it will not engage a stop carried by the valve body upon subsequent arcuate movement of both handles while in their rocked position in response to a manual pull exerted on the lever connected to either one of the handles.

12 Claims, 4 Drawing Figures

DOUBLE HANDLE SELF-LOCKING MECHANISM FOR MANUAL OPERATION OF A COCK KEY

BACKGROUND OF THE INVENTION

On a sliding center sill-type of railway car the sliding center sill and car coupler are simultaneously movable longitudinally relative to the car body due to slack action and also angularly in a sidewise direction as a result of movement of the bolster and body relative to the truck frame as the car travels around a curve. This sliding center sill-type of railway car often has a brake pipe end cock carried by the car coupler. One end of this cock is connected by a flexible hose to one end of the brake pipe which is carried by and extends from end to end of the car body, and the other end has connected thereto one end of a hose the opposite end of which carries a hose coupling that may be manually coupled to a corresponding hose coupling at the adjacent end of the next car in the train. Such a brake pipe end cock is located substantially midway the width of the car. Therefore, in order to provide adequate safety to railway operating personnel, it is desirable that such a brake pipe end cock be operated from either side of the car thereby making it unnecessary for a member of a train crew to go between two adjacent cars to open or close this cock.

Accordingly, it is the general purpose of this invention to provide a double handle self-locking mechanism, operable from either side of a railway car, to effect rotation of the valve of a brake pipe end cock, movably supported by and beneath a coupler head or shank, from an open to a closed position and vice versa.

SUMMARY OF THE INVENTION

According to the present invention, a brake pipe end cock, movably supported by and beneath a coupler head or shank and connected by a hose to the brake pipe carried by the car body of a sliding center sill-type of railway car, is operable from either side of the car by rocking one or the other of a pair of levers or pull rods about a corresponding fulcrum member carried at the end of the car body to effect rotation of a pair of coaxial handles, each pivotally mounted on a socket member secured to a cock key and connected to the other via a gear segment, thereby moving a pair of lugs carried by one of the handles to a position such that, upon subsequently exerting a pull on the one rod to effect rotation of the cock key to open or close the cock, these lugs will not engage a stop carried by the body of the cock.

DESCRIPTION

Figure 1:
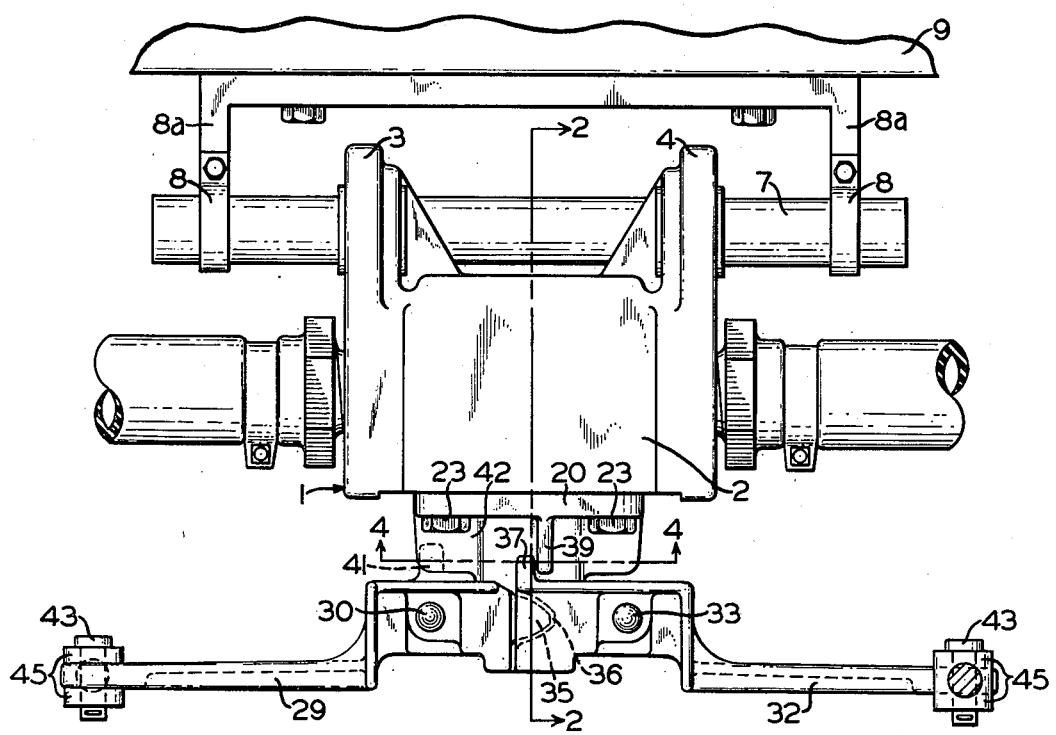
FIG. 1 is an elevational view, in outline, showing a brake pipe end cock movably suspended from the shank of a railway car coupler and a self-locking handle mechanism for manually opening and closing the cock.
Figure 2:
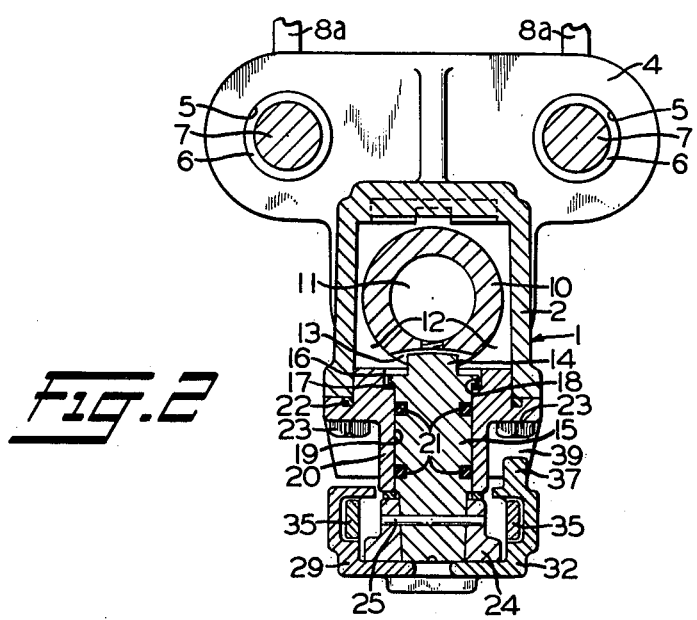
FIG. 2 is a vertical cross-sectional view, taken along the line 2—2 of FIG. 1 and looking in the direction of the arrows, showing the internal construction of the end cock shown in FIG. 1.

Referring to FIGS. 1 and 2 of the drawings, it will be seen that a brake pipe end cock 1 has a body 2 that has formed integral therewith a pair of parallel spaced-apart flanges 3 and 4. Each of these flanges is provided with a pair of spaced-apart bores 5 in each of which is press-fitted a bushing 6. Extending through each bushing 6 with a sliding fit is a support rod 7 the length of which is greater than the distance between the flanges 3 and 4 whereby the end cock 1 is movable along these support rods 7.

Surrounding each support rod 7 adjacent the respective opposite ends thereof is a metallic band 8 that is connected by any suitable means to a hanger member 8a which is secured by any suitable means to the shank 9 of a railway car coupler.

Each end of the cock body 2 is provided with an internally-threaded passageway opening at one end into a valve chamber within the body. The other or outer end of each of these passageways is adapted to receive the screw-threaded nipple at one end of a piece of flexible brake pipe hose. One piece of hose serves to connect one end of the cock body 2 to one end of the brake pipe (not shown) that extends from one end to the other of a railway car. The other end of the other piece of hose is provided with a hose coupling (not shown) which may be connected to a like hose coupling on the end of a hose at the adjacent end of another railway car when coupling two cars. Since the cock body 2 is slidable along the support rods 7 and the one piece of hose connecting this body 2 to the brake pipe is flexible, the body 2 can be moved along the support rods 7 until it occupies the proper position to enable the hose coupling at the other end of the other piece of hose to be manually coupled to a like hose coupling carried at the end of a piece of hose connected to the adjacent end of the brake pipe on another car.

Thus, a railway car provided at each end with a brake pipe end cock constituting the present invention can be coupled to any type of railway car and the brake pipe on the two cars connected by means of the hose couplings at the adjacent ends of the two cars.

As shown in FIG. 2, disposed in the valve chamber within the body 2 is a ball valve 10 having a passageway 11 extending therethrough. Also disposed in this valve chamber and interposed between the walls surrounding this chamber and the ball valve 10 is a pair of ported ball seats 12. Each seat 12 is constructed of some suitable flexible material such as, for example rubber, and is provided with a hemispherical cavity in which is received one half of the ball valve 10.

The spherical surface of the ball valve 10 is provided with a slot 13 in which is received a tongue 14 formed at one end of a cock key 15. This cock key 15 adjacent the tongue 14 has formed integral therewith a collar 16 which is supported by a washer bearing 17 disposed in a counterbore 18 that is coaxial with a bore 19 that extends through a bottom cover 20 and in which the cock key 15 is rotatably mounted. In order to provide a seal between the cock key 15 and the wall surface of the bore 19, the cock key 15 is provided with a pair of spaced-apart grooves in each of which is disposed an O-ring seal 21.

As shown in FIG. 2, a cover gasket 22 is interposed between the cock body 2 and the bottom cover 20 to form a seal therebetween when this bottom cover 20 is secured to the body 2 by a plurality of cap screws 23 two of which appear in FIGS. 1 and 2.

Figure 3:
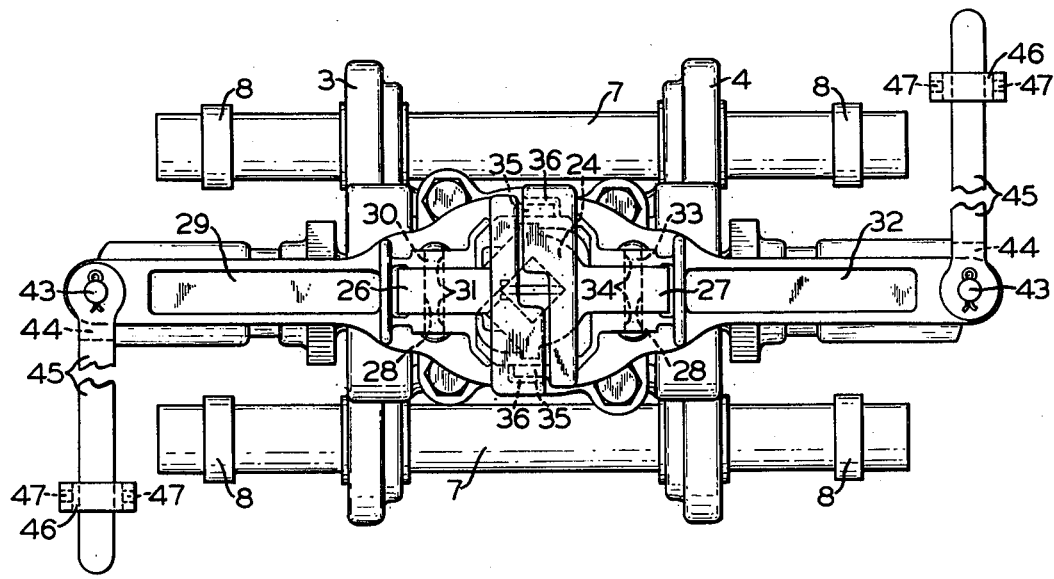
FIG. 3 is a bottom view of the brake pipe end cock shown in FIG. 1 showing means for operating the end cock from either side of a railway car.

The cock key 15 extends through the bore 19 in the bottom cover 20 and has a socket member 24 secured thereto by a pin 25. As shown in FIG. 3, this socket member 24 has formed integral therewith and extending in opposite directions therefrom a pair of arms 26 and 27 in each of which is provided a bore 28.

In order to provide for effecting manual rotation of the cock key 15 and ball valve 10 by a trainman from either side of the car, a bifurcated handle or operating link 29 is rockably mounted on the arm 26 by a pin 30 that extends through the bore 28 in this arm 26 and has its opposite ends anchored in a bore 31 in the bifurcated end of this handle 29, and a bifurcated handle or operating link 32 is rockably mounted on the arm 27 by a pin 33 that extends through the bore 28 in this arm 27 and has its opposite ends anchored in a bore 34 in the bifurcated end of this handle 32.

One bifurcation of each of the handles 29 and 32 is provided with a gear tooth 35. The other bifurcation on each handle is provided with a recess 36 for receiving therein the gear tooth 35 on the other handle. The contour of each of the opposite wall surfaces of each recess 36 is the same as that of one side of the gear tooth 35. Therefore, whenever the handle 29 is rocked about the pin 30, the tooth 35 on the one bifurcation of this handle 29 will be moved into abutting relationship with one of the walls of the recess 36 in the other bifurcation of the handle 32 and thereafter cause rocking of this handle 32 about the pin 33 in a direction opposite the direction in which the handle 29 is being rocked, as is apparent from FIG. 1 of the drawings.

Likewise, whenever the handle 32 is rocked about the pin 33, the tooth 35 on the one bifurcation of this handle 32 will be moved into abutting relationship with one of the walls of the recess 36 in the other bifurcation of the handle 29 and thereafter cause rocking of this handle 29 about the pin 30 in a direction opposite the direction in which the handle 32 is being rocked. Thus, whenever either one of the handles 29 and 32 is rocked in either direction about its respective fulcrum pin 30 or 33, the other handle is simultaneously rocked in an opposite direction.

Figure 4:
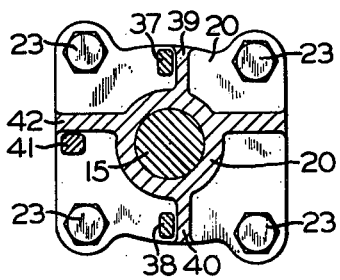
FIG. 4 is a horizontal cross-sectional view, taken along the line 4—4 of FIG. 1 and looking in the direction of the arrows, showing the structural details of the bottom cover for the end cock.

While the ball valve 10 occupies the position shown in FIG. 2, a pair of lugs 37 and 38 on the respective two bifurcations of the handle 32 are disposed respectively on the left-hand side, as viewed in FIG. 4, of a pair of webs or wings 39 and 40 that are formed integral with the bottom cover 20 and extend outward therefrom. These lugs 37 and 38 on the handle 32 and the webs or wings 39 and 40 prevent rotation of the ball valve 10 and cock key 15 by the handle 32 or the handle 29 until these handles are simultaneously rocked out of the horizontal position in which they are shown in FIG. 1 to a position in which the lug 37 will clear the web or wing 39 and the lug 38 will clear the web 40, it being understood that the gear teeth 35 provide for the simultaneous rocking of the two handles.

Formed integral with one side of the arm 26 of the socket member 24 is a lug 41 (FIGS. 1 and 4) that is adapted to engage a web or wing 42 that is also formed integral with the bottom cover 20, it being noted from FIGS. 1 and 4 that this web 42 is so disposed as to form a right angle with the webs 39 and 40. Moreover, the lug 41 by abutting this web 42 prevents clockwise rotation, as viewed in FIG. 4, of the cock key 15 and ball valve 10.

The simultaneous rocking and subsequent rotation of the two handles 29 and 32 through an angle of substantially ninety degrees to rotate the ball valve 10 via the cock key 15 from an open position to a closed position and vice versa may be effected by a trainman from either side of the car by means now to be described.

Adjacent their outer ends, each of the handles 29 and 32 is provided with a bore for receiving a headed pin 43 that extends through coaxial bores in the spaced-apart jaws of a clevis 44 formed at one end of a combined manual operating lever and pull rod 45. The lever 45 that is connected to the handle 29 extends to one side of the car and the lever 45 that is connected to the handle 32 extends to the other side of the car as is best illustrated by FIG. 3 of the drawings, it being noted that FIG. 3 is a bottom view or a view from beneath the car. Intermediate its ends, each of the levers 45 is supported in a U-shaped hook member 46 each spaced-apart arm of which is provided with a bore 47 that is coaxial with the bore 47 in the other arm. These bores 47 enable each respective U-shaped member 46 to be supported as by a pin (not shown) carried in such as a bracket (not shown) that is secured to the body of the car.

Each of the U-shaped members 46 serves as a fulcrum for the respective lever 45 supported thereon to enable manual rocking of the lever by a trainman to cause simultaneous rocking of the two handles 29 and 32 from the horizontal position in which they are shown in FIG. 1 to an inclined position.

OPERATION

Assume that each of two adjacent railway cars has at each end a brake pipe end cock 1 one end of which is connected by a flexible hose to one end of the usual brake pipe (not shown) that extends from end to end of each car.

When the car couplers at the adjacent ends of these two cars are coupled, as when these cars are hauled in a train, the other end of the brake pipe end cock 1 at one end of one car is connected by a hose and hose coupling to the other end of the brake pipe end cock 1 at the adjacent end of the other one of the two cars.

It may be further assumed that the ball valve 10 (FIG. 2) in each of these brake pipe end cocks 1 is in its open position to thereby provide for the flow of fluid under pressure from the brake pipe on one car to the brake pipe on the adjacent car.

Assuming that the ball valve 10 in each brake pipe end cock 1 occupies its open position and that the handles 29 and 32 of each of these cocks occupy their horizontal position, as shown in FIG. 1, let it be supposed that two adjacent cars in a train are to be uncoupled one from the other in order that the cars comprising one section of a train may be pulled by a locomotive away from the cars comprising a second section of the train.

In order to prevent flow of fluid under pressure from the brake pipe of each section of the train to atmosphere when one section is pulled away from the other, the ball valve 10 in the brake pipe end cocks 1 at the adjacent ends of the two cars that are to be uncoupled are closed, prior to uncoupling the couplers of these two cars, in a manner now to be described.

Since operation of each brake pipe end cock is the same, a description of the operation of one will suffice for both.

The ball valve 10 of the brake pipe end cock 1 shown in FIGS. 1, 2 and 3 can be closed from one side of the car or from the other side accordingly as the trainman grasps the outer end of that one of the levers 45 that extends to his side of the car and thereafter applies a manual force to this lever to rock it about the corresponding U-shaped hook member 46 in the direction to cause simultaneous rocking of the handles 29 and 32 from the horizontal position in which they are shown in FIG. 1 to an inclined position.

Referring to FIGS. 1 and 3, let it be assumed that the trainman grasps the outer end of the lever 45 that is connected by the pin 43 to the handle 32 and then applies a manual force to this lever to rock it about the corresponding U-shaped hook member 46, which acts as a fulcrum, in the direction to cause the handle 32 to be rocked counterclockwise about the pin 33 from the horizontal position in which it is shown in FIG. 1 to an inclined position.

As the handle 32 is thus rocked counterclockwise about the pin 33, the upper side or wall of the recess 36 in the bifurcated end of this handle will be moved into abutting relatioship with the gear tooth 35 that is provided on one bifurcation of the bifurcated end of the handle 29.

Since the contour of each wall surface of the recess 36 is the same as that of one side of the gear tooth 35, it is apparent that the gear tooth 35 will now have rolling contact with this upper wall surface of the recess 36 as handle 32 continues to be rocked counterclockwise.

From the foregoing, it is apparent that as the handle 32 is rocked counterclockwise about the pin 33, it is effective, via the recess 36 in this handle 32 and the gear tooth 35 that is integral with the handle 29, to cause simultaneous clockwise rocking of this handle 29 about the pin 30.

Moreover, it is apparent from FIG. 1 that when the handle 32 is rocked counterclockwise about the pin 33, the lug 37 thereon will be moved downward and away from the web 39. Since the lug 38 (FIG. 4) is also integral with the handle 32, this lug will be moved downward and away from the web 40.

Therefore, after the handle 32 has been rocked counterclockwise about the pin 33 far enough for the lug 37 to clear the web 39 and the lug 38 to clear the web 40, the trainman will exert an outward pull on the right-hand lever 45. It is apparent from FIG. 3 that this outward pull on the right-hand lever 45 is transmitted via pin 43 to the right-hand end of the handle 32 which is now in an inclined position. This force transmitted to the handle 32 is effective to rotate it, and also the handle 29, counterclockwise, as viewed in FIG. 3.

Since the handle 32 is connected to the arm 27 of the socket member 24 by the pivot pin 33 and this socket member 24 is connected by the pin 25 (FIG. 2) to the cock key 15 the tongue 14 of which is disposed in the slot 13 in the spherical surface of the ball valve 10, it is apparent that as the handles 32 and 29 are rotated counterclockwise, as viewed in FIG. 3, by the outward pull exerted by the trainman on the outer end of the lever 45, the ball valve 10 is rotated about its vertical axis from its open position in which it is shown in FIG. 2 to a closed position.

When the ball valve 10 in each one of the two brake pipe end cocks 1 at the adjacent ends of the two coupled railway cars have been rotated from their open position to their closed position in the manner described above, the couplers coupling these two cars may be uncoupled in the usual manner.

Subsequent to uncoupling the two couplers between the two adjacent cars, the locomotive may pull one section of the train away from the other.

It will be understood that the two hose couplings are so constructed that they are automatically uncoupled one from the other when the locomotive pulls one section of the train away from the other without damage to these hose couplings or the pieces of hose to one end of which they are attached by the usual hose clamp.

It will be understood that if the trainman is standing on the other side of the car, he may effect closing of the ball valve 10 in the brake pipe end cock 1 by operating the left-hand lever 45 shown in FIG. 3 in the same manner as described above for the right-hand lever 45.

Referring to FIG. 4, it will be noted that the lug 41, which is integral with one side of the arm 26 of the socket member 24, limits counterclockwise rotation of the cock key 15, and therefore the ball valve 10, through an angle of substantially 90° as this lug 41 is rotated counterclockwise from the position in which it is shown in FIG. 4 to a position in which it abuts the left-hand side of the web or wing 40.

Thus, in the closed position of the ball valve 10, the opposite ends of the passageway 11 in this ball valve 10 are closed by the respective one of the flexible ball seats 12 thereby preventing flow through this passageway 11 from the brake pipe to atmosphere via the hose and uncoupled hose coupling secured to one end of this hose.

Having now described the invention, what I claim as new and desire to secure by Letters Patent is:

1. For use with a cock having a body disposed in a fluid pressure conduit and a valve rotatably mounted in the body for rotation between an open position in which flow of fluid under pressure through the conduit is established and a closed position in which flow of fluid under pressure through the conduit is prevented, a self-locking operating mechanism for rotating the valve between its open and closed positions, said self-locking operating mechanism comprising;
   a. a member connected to the valve for effecting rotation thereof, said member having a pair of oppositely extending arms, wherein the improvement comprises;
   b. a fulcrum carried by each of said arms,
   c. a pair of links each pivotally mounted on the fulcrum carried by one of said arms and rockable about its respective fulcrum from a first position, in which said self-locking mechanism locks said valve against rotation to a second position, in which said valve may be rotated from one of said open or closed positions to the other,
   d. means so operatively connecting said links that rocking of either effects rocking of the other,
   e. at least one fulcrum member,
   f. at least one lever slidably supported on said at least one fulcrum member and operatively connected to one of said pair of operating links for effecting rocking and rotation thereof,
   g. stop means carried by the cock body, and
   h. means carried by one of said operating links for so cooperating with said stop means as to prevent rotation of said pair of links by said at least one lever prior to the rocking of said pair of links from their first to their second position.

2. A self-locking operating mechanism, as recited in claim 1, further characterized by a cock key connecting said member to the valve, said key being rotatably mounted in the body and having said member removably mounted thereon.

3. A self-locking operating mechanism, as recited in claim 1, further characterized in that each of said oppositely extending arms of said member is provided with a bore, and a pin is disposed in each bore whereby each pin constitutes the fulcrum for one of said pair of links.

4. A self-locking operating mechanism, as recited in claim 1, further characterized in that each of said pair of links is bifurcated at one end, each of said bifurcations having a bore that is coaxial with the bore in the other bifurcation, said coaxial bores enabling each link to be pivotally mounted on its respective fulcrum.

5. A self-locking operating mechanism, as recited in claim 1, further characterized in that said means so operatively connecting said links that rocking of either effects rocking of the other comprises a gear segment carried by each link, the gear segment of each link always having a line of contact with the gear segment of the other link whereby the rocking of either link in one direction simultaneously effects rocking of the other link in an opposite direction.

6. A self-locking operating mechanism, as recited in claim 1, further characterized in that said at least one fulcrum member comprises a metallic strip so bent as to form a U having two spaced-apart arms for guidably supporting therebetween said at least one lever.

7. A self-locking operating mechanism, as recited in claim 1, further characterized in that said stop means comprises a pair of oppositely extending wings formed integral with the cock body and so disposed as to be in abutting relationship with said means carried by said one operating link prior to the rocking thereof from its said first to its said second position.

8. A self-locking operating mechanism, as recited in claim 1, further characterized in that said means carried by said one operating link for cooperation with said stop means comprises a pair of spaced-apart lugs formed integral with said one link and so disposed as to be in abutting relation with said stop means prior to the rocking of said one link from its said one to its said second position.

9. A self-locking operating mechanism, as recited in claim 1, further characterized by means carried by one of said oppositely extending arms of said member and so cooperating with said stop means as to limit rotation of said member and thereby the valve through a certain chosen angle.

10. A self-locking operating mechanism, as recited in claim 1, further comprising;
   a. a second fulcrum member, and
   b. a second lever slidably supported on said second fulcrum member and operatively connected to the other one of said pair of operating links for effecting rocking and rotation thereof thereby enabling selective rocking and subsequent rotation of said pair of links by use of one or the other of said levers.

11. A self-locking operating mechanism, as recited in claim 4, further characterized in that each bifurcation at one end of each of said links is provided with a gear segment, the gear segments provided on the bifurcations at one end of one of said links having a line of contact with the gear segments provided on the bifurcations at the one end of the other link whereby rocking of either link in one direction effects simultaneous rocking of the other link in an opposite direction.

12. A self-locking operating mechanism, as recited in claim 4, further characterized by a lug carried on each respective bifurcation at the one end of one of said links, and by a third lug carried by one of said oppositely extending arms of said member, said three lugs so cooperating with said stop means carried by the cock body as to insure rocking of each of said pair of links about its respective fulcrum through a chosen angle prior to subsequent rotation of said member and thereby the valve through a chosen angle.

* * * * *